Jan. 30, 1962 G. E. STANTON 3,018,852
COMBINATION RETRACTING MECHANISM AND WEAR INDICATOR
Filed March 10, 1958 2 Sheets-Sheet 1
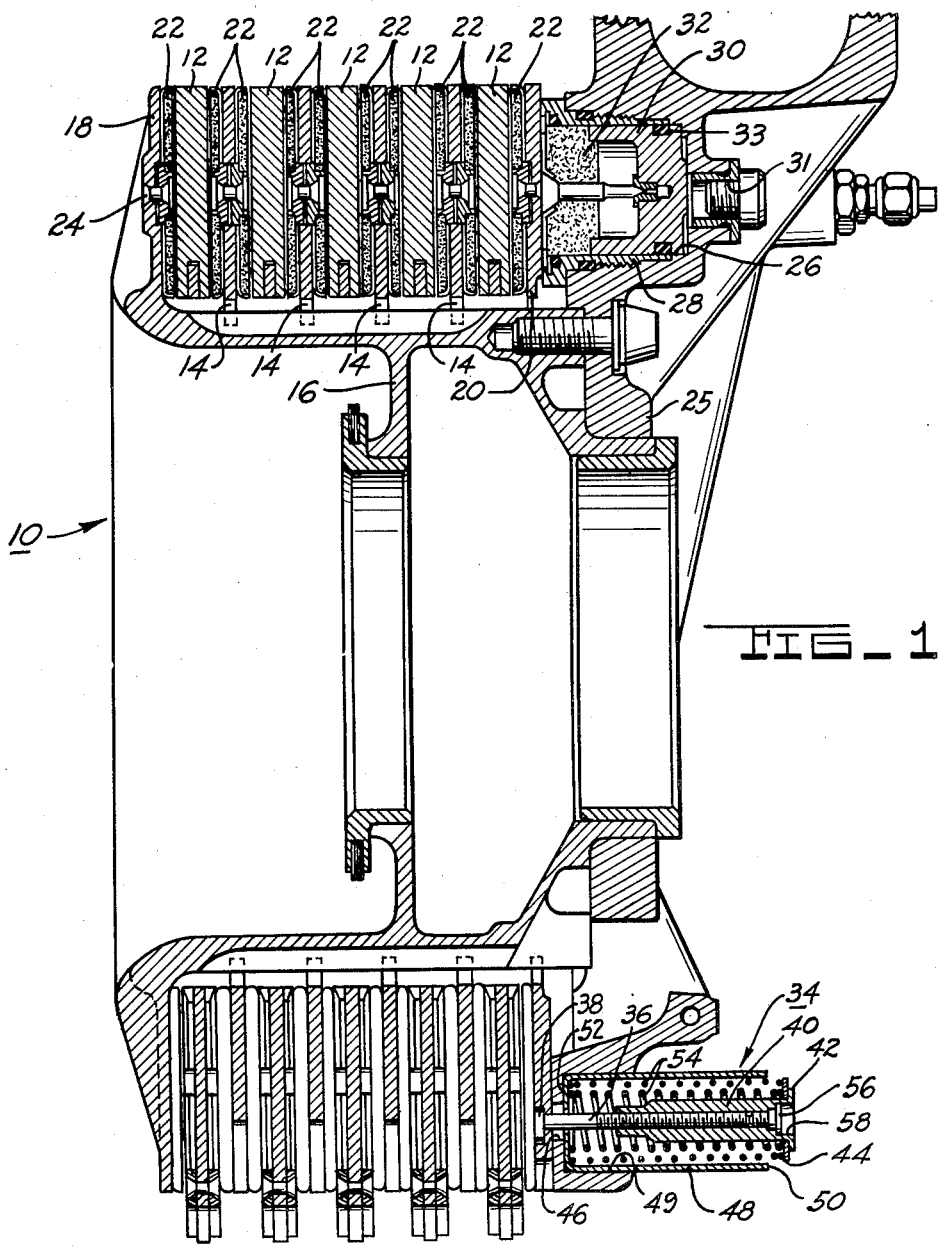
FIG_1
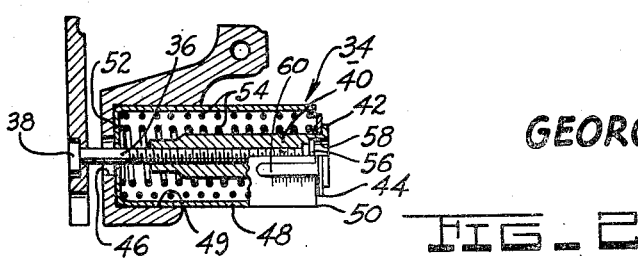
FIG_2
INVENTOR.
GEORGE E. STANTON.
BY
John A. Young
ATTORNEY.

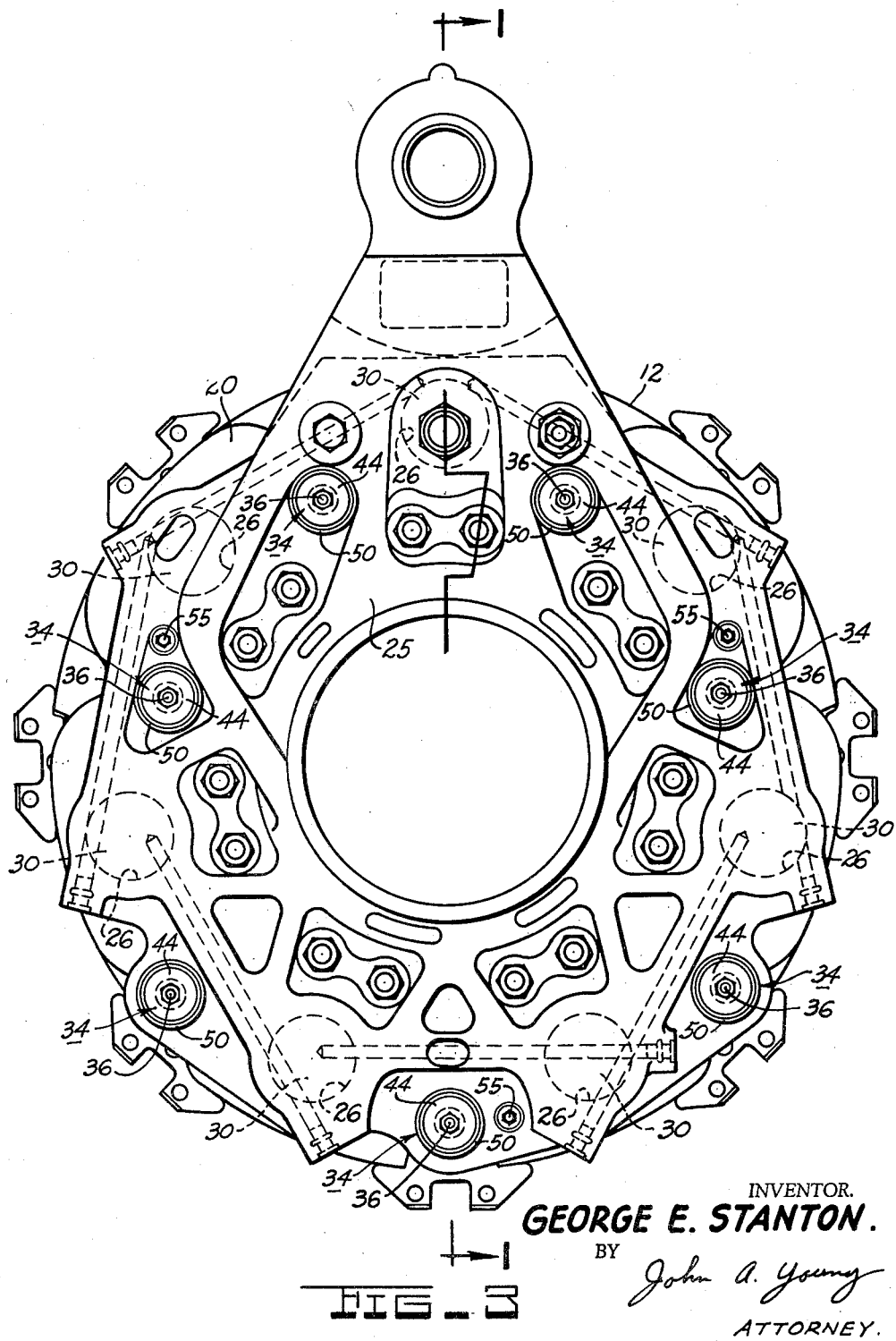

United States Patent Office 3,018,852
Patented Jan. 30, 1962

3,018,852
COMBINATION RETRACTING MECHANISM
AND WEAR INDICATOR
George E. Stanton, South Bend, Ind., assignor to The
Bendix Corporation, a corporation of Delaware
Filed Mar. 10, 1958, Ser. No. 720,359
2 Claims. (Cl. 188—72)

This invention relates to a brake retracting mechanism which also provides a means for visually inspecting the extent of brake wear.

The invention will be described in conjunction with a disk type brake in which laterally movable, relatively-rotatable friction members are forcibly engaged during a brake application. It will be appreciated, however, that the invention is usable not only with brakes of this general description, but also with other braking devices.

In the construction of the typical disk type brake, there is provided a number of interleaved rotor and stator members, some of which are lined with suitable friction material. At the one side of the "stack" of rotors and stators, is a fixed backing plate against which the stack of rotors and stators is thrust, and at the opposite side of the stack is a pressure plate which bears against the stack of rotors and stators and presses them together and against said backing plate. The rotors and stators and the pressure plate are axially movable to permit their interengagement.

In the manufacture of the brake, the rotors and stators are separately made and then assembled into the brake. Unavoidable manufacturing tolerances give rise to variations in dimension along the width of the brake and these variations must be taken into account in the assembly thereof.

The variation in over-all length between the backing plate and the pressure plate can be as much as 0.100 inch. It is a considerable problem to provide a suitable retracting mechanism since the retracting effort depends upon the movement of the pressure plate and this in turn is dependent on changes in length of the brake from the pressure plate to the backing plate. Thus, with this variation of 0.100 inch, the same retracting mechanism produces different retracting effort from one brake to the other.

It is one of the objects of the present invention to provide a brake-retracting mechanism, which can be adjusted to allow for manufacturing tolerances in the brake so that regardless of dimensional variations in the brake, the retracting mechanism can develop equal retracting effort.

Another object of the invention is that the retractor mechanism, in addition to functioning as a brake return means, will also measure and indicate for visual inspection the amount of brake wear which occurs during the life of the brake. Thus, by referring to the retractor mechanism, it can be seen how much the brake has worn from its original state. This is a considerable safety development, since it is of obvious importance that the wheel be at all times provided with a brake having sufficient lining to provide the necessary braking efforts. Periodic inspections of the retractor mechanism, will provide the necessary information on the brake condition so that the degree of wear of the linings and rotors is available at all times.

It forms an important part of this invention that the combination retractor and wear indicating mechanism is a very uncomplicated structure which is not easily subject to malfunctioning and is very little affected by braking heat.

One of the important features which results from the foregoing invention is a reduction in the over-all width of the brake which will give a valuable space saving, this always being an important feature since in almost every aircraft there is a premium on reduced volume constructions.

Other objects and features of the invention will become apparent, from a consideration of the following description, which proceeds with reference to the accompanying drawings, wherein:

FIGURE 1 is an axial section view taken through a disk brake, having the combination retractor and wear indicating device installed therein;

FIGURE 2 shows the retractor mechanism and wear indicator, removed from FIGURE 1, and in the position taken when the brake is fully applied; and, FIGURE 3 is a side elevation of the disk brake shown in FIGURE 1 illustrating the circumferential spacing of the retracting, and actuating means.

The aircraft brake designated generally by reference numeral 10 is of a disk type construction. The brake consists of a plurality of interleaved rotors 12 which are splined to and are rotated by the aircraft wheel (not shown) and stators 14 which are splined to a nonrotatable axle 16. Both the rotors and stators are movable axially and are sometimes referred to as a brake "stack." It is the frictional engagement of these relatively rotatable rotors and stators which produces the braking action on the aircraft wheel. At the one side of the stack is an upturned flange 18 of the axle 16 which is hereafter referred to as a backing plate. At the other side of the stack is a pressure plate 20, the purpose of which is to clamp the rotors 12 and stators 14 together by thrusting at one side of the stack and biasing the entire stack against the backing plate 18, since the rotors and stators are splined.

Pressure plate 20, each of the stators 14 and the backing plate 18 have friction material lining 22 provided thereon. The lining is often formed in segments and is individually attached by rivets 24 or the like to its associated mounting structure. Neither the composition, arrangement, nor mounting of the friction segments forms an essential part of the present invention. In the manufacture of these friction segments, it is very difficult to standardize upon the width of the segment since the segments are formed by powdered metallurgical processes and the thickness of the segment depends upon a large number of variables, including compacting pressures, temperatures, sintering conditions, grinding, etc. The distance from the pressure plate 20 to the backing member 18 is a function of the accumulative manufacturing tolerances in the manufacture of the friction segments 22, the rotors 12, and the stators 14.

Adjacent the pressure plate 20 is a carrier plate 25 which may be constructed at the terminus of an aircraft strut (not shown). Carrier plate 25 has a number of spaced cylinder bores 26 which are threaded to receive sleeves 28 which are very closely machined so that the inner periphery thereof provides bearing surfaces for the pistons 30.

Pistons 30 are hydraulically actuated by pressure which is communicated thereto through ports 31. The usual O-ring seals 33 are provided to seal the fluid actuators. Between the piston 30 and the pressure plate 20 is insulating material 32 which insulates the hydraulic fluid for actuating the fluid motor. Otherwise, the braking heat could vaporize the hydraulic fluid.

Also mounted in the carrier plate 25 are a number of brake retractors each designated generally by reference numeral 34. Each retractor consists of a stem 36 having an enlarged end 38 connecting with pressure plate 20. The other end of the stem is threaded and the threaded portion extends along the major part of the length of the stem. An internally threaded sleeve 40 is screwed onto the stem 36 and has a shoulder 42 which is constructed transversely of the sleeve 40. At the under surface of the shoulder 42, there may be provided a larger diameter washer 44. The carrier plate 25 has an opening 46 through which the stem 36 extends for engagement with the pressure plate.

A countersunk opening 49 in the carrier is snug fitted with a thin-walled, tubular-shaped member 48, which is open ended at 50 and the walls of which are turned in at end 52. A spring group 54 consisting of two concentric helically wound springs is compressed between end 52, and washer 44, there being fixed and movable stops respectively for the spring group 54. A slot 60 cut in the wall of the tubular member 48 adjacent the shoulder 42 provides means whereby the position of the shoulder 42 relative to the end of the tubular member 48 may be observed as the shoulder member 42 moves progressively farther within the tubular member 48 in response to increasing brake wear (see FIGURE 2). At the outer surface of the tubular member 48 adjacent the slot 60, a suitable calibration is provided so that the position of shoulder 42 relatively to the tube 50, with the brake fully applied, gives a measure of the braking wear.

The retracted position of the brake is determined by contact of the pressure plate 20 with three or more adjustable stops 55 (FIGURE 3).

Operation

Referring next to the operation of the device, the brake is actuated by energizing the pistons 30 which force the pressure plate 20 into engagement with the adjacent rotor 12. This axial motion is then imparted to the next successive stator, which engages the next adjacent rotor, etc., until the entire stack is clamped together frictionally against the backing member 18. The amount of movement of the piston is determined by the running clearance established between the adjacent rotors and stators.

When the brake is fully applied, the movement of the pressure plate 20 is equal to the total running clearance between the friction surfaces of the stack, and this movement of the pressure plate pulls the stem 36 through a like distance to compress the spring group 54. When the braking effort developed by the fluid motor 30 is relieved, it is necessary to re-establish some running clearance in the brake to prevent braking drag which otherwise causes a wasting of the friction lining, and overheating of the brake, among other undesirable results.

The braking force is relieved by the spring group 54 bearing against the washer 44, this spring force being transmitted as retracting effort on the pressure plate 20 through the stem 36. The pressure plate 20 is returned to its point of engagement with the stops 55.

As mentioned previously, there are inevitable dimensional variations across the width of the brake because of the tolerances in manufacture of the friction segment, rotors, stators, etc. If the stops 55 are adjusted so as to obtain the same initial running clearance in the brake, there is inevitably a difference in displacement of the pressure plate from the carrier 24 and this difference will develop different degrees of retracting force on the pressure plate, by the retracting mechanism 34, because the springs 54 become compressed a greater or lesser amount depending upon the initial displacement of the pressure plate 20. To provide for this variation, so that initially, regardless of the manufacturing tolerances, the same retracting is provided on each brake, the retractor is adjusted as follows:

The brakes when first installed are fully applied and the stops 55 are turned so that they just engage the pressure plate 20. The adjustor stops 55 are then backed off by an amount establishing the desired running clearance for the brake. The retractor 34 is simultaneously adjusted by varying the effective length of stem 36 and this is done by elongating its effective length so that it advances toward the pressure plate or away from it so that when the brake is fully applied the end 42 will always be a given distance from the end 52. The regulation of displacement loads the spring group 54 so that the retracting effort from one brake to the other will be constant. Thus, when the braking pressure is relieved from this initial setting, the retractor 34 will retract the brake with the same applying effort regardless of the manufacturing tolerances. Since the washer 42 is always displaced from stop 52 by the same initial amount, in spite of the variations in dimensions from brake to brake, this can be used as a means for measuring the total amount of braking wear. Thus, as the lining 22 wears and the opposing rotor surface wears, then the pressure plate 20 is moved farther toward the reaction plate 18 on each successive application, and this movement correspondingly makes the washer 42 move farther toward the reaction plate 18 on each successive application. The fixed tubular member 50 can be calibrated so that with the brakes full on, movement of the washer 42 relatively thereto can be used to measure the amount of braking wear. Thus, from time to time, the mechanic needs only to refer to the position of stop 42 relatively to the calibration on tubular member 50 and the amount of movement will show how much wear of the brake has progressed. It is obvious, that with this indication, the mechanic can easily predict how much useful brake life is remaining, and can take the necessary replacement and/or repair measures at the proper time so that the wheels are never without effective braking members.

When there is no internal adjustment in the retracting mechanism to compensate for manufacturing tolerances in the brake, then this previously described 0.100 inch dimensional variation of the brake must be met by increasing the length of the spring group 54. This can add to the length of the spring group by at least twenty-two percent and since the springs are typically four inches long this adds an extra one inch length to the spring group. The added length is undesirable as previously pointed out.

It is not necessary to the invention that there be a threaded connection between the sleeve 40 and the stem 36. This adjustment can be provided through ratchet connection as well as a threaded connection. It is also possible to thread the washer 42 onto the sleeve 40 making it an integral portion thereof.

Once the sleeve 40 and stem 36 are properly adjusted, further movement is prevented by means of a locking screw 56 which passes through a counterbore opening 58 at the end of the sleeve 40 and is screwed tightly against the end of the stem 36. The locking screw 56 can be loosened to provide successive adjustments.

While this invention has been described in connection with a single selected embodiment of the invention, it will be understood that this is merely an example of the invention and is in no way restrictive thereof. It is assumed that those skilled in the art can make numerous modifications and adaptations of the invention and it is intended that such adaptations and revisions of the invention, as incorporate the herein disclosed principles, will be included within the scope of the following claims.

I claim:

1. A combination brake retractor and wear indicator received in a fixed mounting plate located adjacent the relatively movable and engageable brake members, said retractor comprising a pull-rod secured to an outermost brake member and arranged to exert retracting effort thereon, a movable first stop adjustably secured to said stem, a fixed second stop axially spaced from said first stop, an adjustable third stop which engages said outermost brake member to establish the retracted position thereof, a resilient member compressed between said first and second stops and loaded by an amount determined from the relative spacing therebetween, said spacing being adjustable to maintain the loading force on said spring to a predetermined amount while varying the effective length of said stem to provide for different size brake members, and a fixed tubular member which is calibrated to provide an indication of brake wear according to the distance traversed by said movable first stop relatively thereto, said resilient member being fitted within said tubular member to confine the resilient member against buckling or the like movement as it is loaded by movement of said movable stop.

2. The structure of claim 1 in which said movable first stop comprises a threaded member screwed onto said stem and is movable thereon to vary the effective length of said stem, and locking means for holding the threaded member against further movement when the adjustment is completed.

References Cited in the file of this patent

UNITED STATES PATENTS

| | | |
|---|---|---|
| 1,950,882 | Gianini | Mar. 13, 1934 |
| 2,034,732 | Sauzedde | Mar. 24, 1936 |
| 2,290,542 | Criley | July 21, 1942 |
| 2,324,613 | Criley | July 20, 1943 |
| 2,561,445 | McCune | July 24, 1951 |

FOREIGN PATENTS

| | | |
|---|---|---|
| 510,037 | Great Britain | July 26, 1939 |